United States Patent
Böse et al.

(10) Patent No.: US 7,473,920 B2
(45) Date of Patent: Jan. 6, 2009

(54) MEASURING DEVICE AND METHOD FOR VERIFYING THE CUT QUALITY OF A SHEET USING IMAGE SCANNING

(75) Inventors: Olaf Böse, Hamburg (DE); Lorenz Ring, Raubling (DE)

(73) Assignee: E.C.H. Will GmbH, Hamburg (DE)

( * ) Notice: Subject to any disclaimer, the term of this patent is extended or adjusted under 35 U.S.C. 154(b) by 221 days.

(21) Appl. No.: 10/574,495

(22) PCT Filed: Sep. 22, 2004

(86) PCT No.: PCT/EP2004/010587
§ 371 (c)(1),
(2), (4) Date: Apr. 3, 2006

(87) PCT Pub. No.: WO2005/033627
PCT Pub. Date: Apr. 14, 2005

(65) Prior Publication Data
US 2007/0120079 A1      May 31, 2007

(30) Foreign Application Priority Data
Oct. 2, 2003   (DE) ............................... 103 46 467

(51) Int. Cl.
*G01N 21/86* (2006.01)
(52) U.S. Cl. .................... 250/559.4; 250/235
(58) Field of Classification Search ................
250/559.04–559.08, 559.26, 559.36, 559.45,
250/235, 234, 221, 208.1, 559.4, 223 R; 73/104,
73/105, 159, 865.8; 358/474, 475, 482, 486–488;
382/315, 318; 355/53, 55, 23, 25
See application file for complete search history.

(56) References Cited

U.S. PATENT DOCUMENTS
4,974,077 A      11/1990   Kusaba
(Continued)

FOREIGN PATENT DOCUMENTS
DE      36 33 089 A1   5/1987
(Continued)

OTHER PUBLICATIONS
XP0023099988 "Epson Expression™ 1640XL User's Guide," Jun. 8, 2003, Seiko Epson Corporation, Japan.
(Continued)

*Primary Examiner*—Que T Le
(74) *Attorney, Agent, or Firm*—Venable LLP; Robert Kinberg; Ryan M. Flandro

(57) ABSTRACT

A measuring device and measuring method are provided for testing the cut quality of a sheet. The measuring device is provided with a transparent scanning substrate for holding the sheet, a scanning device with a scanning window, and a cover for covering the sheet held by the scanning substrate, wherein the scanning window overlaps the sheet, forming edge regions, and the cover has different reflection properties from the sheet for producing a high-contrast scanned image of the sheet and of the edge regions between the sheet and the scanning window. The measuring method includes positioning the sheet on a transparent scanning substrate, covering the sheet with a cover, and scanning the sheet with a scanning device, wherein the scanning device scans in the region of a scanning window which encompasses both the sheet and edge regions surrounding the sheet, and differences in contrast between the sheet and the edge regions are detected.

19 Claims, 1 Drawing Sheet

U.S. PATENT DOCUMENTS

| | | | |
|---|---|---|---|
| 4,982,228 A | | 1/1991 | Watanabe |
| 5,115,144 A | | 5/1992 | Konishi et al. |
| 5,241,483 A | | 8/1993 | Porret et al. |
| 5,323,219 A | | 6/1994 | Hamanaka et al. |
| 5,623,850 A | * | 4/1997 | Szczepaniak et al. ......... 73/159 |
| 2003/0133002 A1 | * | 7/2003 | Morita ....................... 347/139 |
| 2003/0231358 A1 | | 12/2003 | Haas et al. |
| 2003/0231367 A1 | | 12/2003 | Quintana |

FOREIGN PATENT DOCUMENTS

| | | |
|---|---|---|
| DE | 37 13 525 A1 | 10/1987 |
| DE | 42 00 801 A1 | 8/1993 |
| DE | 195 10 753 A1 | 9/1996 |
| DE | 101 16 575 A1 | 11/2001 |
| DE | 103 07 938 A1 | 1/2004 |
| DE | 103 17 923 A1 | 1/2004 |
| EP | 0 733 878 A | 10/1966 |
| EP | 0 358 331 A2 | 3/1990 |
| WO | WO-91/02941 | 3/1991 |

OTHER PUBLICATIONS

Search Results <http://epson.co.uk/support/manuals/manuals_pdf.htm>, Internet Archive Wayback Machine, Feb. 16, 2004.

XP002309986, <www.scannergalaxy.com/showroom/epson_accessories.cfm>, Aug. 20, 2003.

XP-002309987 Search Results <http://www.scsannergalaxy.com/showroom/epson_accessories.cfm>, Internet Archive Wayback Machine, Feb. 22, 2004.

International Preliminary Report on Patentability, Jul. 27, 2006, PCT/EP2004/010587.

* cited by examiner

MEASURING DEVICE AND METHOD FOR VERIFYING THE CUT QUALITY OF A SHEET USING IMAGE SCANNING

CROSS-REFERENCE TO RELATED APPLICATIONS

This application is a national phase of International Application No. PCT/EP2004/010587, filed Sep. 22, 2004, and claiming priority of European (Germany) Application No. 103 46 467.0, filed Oct. 2, 2003, the entire contents of which are incorporated herein by reference.

The present invention concerns a measuring device for testing the cut quality of a sheet as well as a measuring method for testing the cut quality of a sheet. The present invention further concerns a modification of known scanners according to claim 18.

Sheets and the like—hereinafter referred to as the sheet or sheets for short—are in general made from large-format rolls of paper by a plurality of cutting processes. At the end and, if necessary, after individual cutting processes, testing of the cut quality is necessary, at least by spot checks. Within the meaning of the present invention, testing the cut quality here includes testing the roughness of the cut edges, the sheet length, the sheet width, the angularity, the maximum difference in sheet lengths and widths arising and—for punched sheets—also hole analysis with testing of the hole diameter, the hole position and the shape of the hole. Testing serves firstly to monitor the manufactured products for compliance with various national standards such as European standard EN 12281 or Xerox US standard, but secondly also to monitor a manufacturing process. On account of the high quality requirements of the manufactured products, there is a need for a reliable measuring device and a reliable measuring method for testing the cut quality.

It is the object of the present invention to provide a reliable measuring device and a reliable measuring method for testing the cut quality of a sheet.

This object is achieved by a measuring device and a measuring method with the features of claims 1 and 10 respectively.

In this way it is made possible to test a sheet by simple means and with a high degree of accuracy with respect to the cut quality. By scanning the sheet and the high-contrast edge regions surrounding the sheet by means of a correspondingly large scanning window of the scanning device, reliable detection of every contour region of the sheet that is of interest is made possible. Thus it is always guaranteed that at the sheet boundaries and apertures such as holes and perforations there is a high-contrast edge region. The scanning window is here formed by the scanning device during a scanning operation, the scanning device commencing scanning at a starting point and ending at a finishing point remote from the latter. The region on the scanning substrate which is scanned between the starting point and the finishing point forms the scanning window.

If the scanning device is connected by a wire to a computer for evaluating the scanned image, measurement results can be determined directly and displayed clearly on a screen.

If a sheet holder for a stack of sheets and a conveyor for drawing in and positioning a sheet are provided adjacent to, advantageously above, the scanning substrate, testing can be largely automated.

If the conveyor is designed as a belt conveyor and the cover is formed by the belt of the belt conveyor, a compact design can be produced. If the belt is made of rubber blanket, a high contrast with a sheet can easily be obtained and at the same time non-slip conveying can be ensured.

Alternatively, the conveyor can be formed by transport rollers and the cover by a cover plate spaced apart from the scanning substrate.

If the conveyor is designed to convey stepwise over the length or width of a sheet and is offset from the stop in the direction of conveying in such a way that the sheet can be laid at a distance from the stop, a known type of scanner can be used by offsetting the conveyor with little expenditure on conversion.

If the conveyor is designed to convey stepwise over the length or width of a sheet plus a distance x and the sheet can be laid at a distance from the stop, a known type of scanner can be used by engagement in the means for controlling the conveying length with little expenditure for engagement in the conveying control means. In a simple case, engagement in the control means takes place in such a way that the conveyor advances the sheet only—in addition to the sheet length or width—by a distance x.

If the cover, the sheet holder and/or the conveyor is held in a lid mounted pivotably by means of hinges adjacent to the scanning substrate, good access to the scanning substrate as well as correct orientation of the above components relative to the scanning substrate can be obtained.

The sheet holder can advantageously have a stop for a stack of sheets which is provided so as to be capable of being positioned over the scanning substrate in such a way that the sheet can be laid on the scanning substrate at a distance from a further stop. In a simple case this stop can be formed by a format adjusting unit, which is known for scanners. Alternatively, the sheet holder can also be correspondingly offset from the scanning substrate, for example after a minor conversion of a known scanner.

If the scanning device scans with a resolution of approximately equal to or more than 1000, preferably 1200 dpi, direct classification in quality stages is made possible. Each pixel can be directly allocated a quality stage. At a lower resolution, it must be accepted that one pixel overlaps the region of two quality stages and can be allocated to both, as a result of which the testing loses accuracy.

The measuring device can be manufactured in a particularly simple manner by minor conversion of known scanners.

Further embodiments of the invention can be found in the subsidiary claims and the following description of an embodiment.

The invention is explained below with the aid of an embodiment of a measuring device shown schematically in details in the figures.

Figure 1:
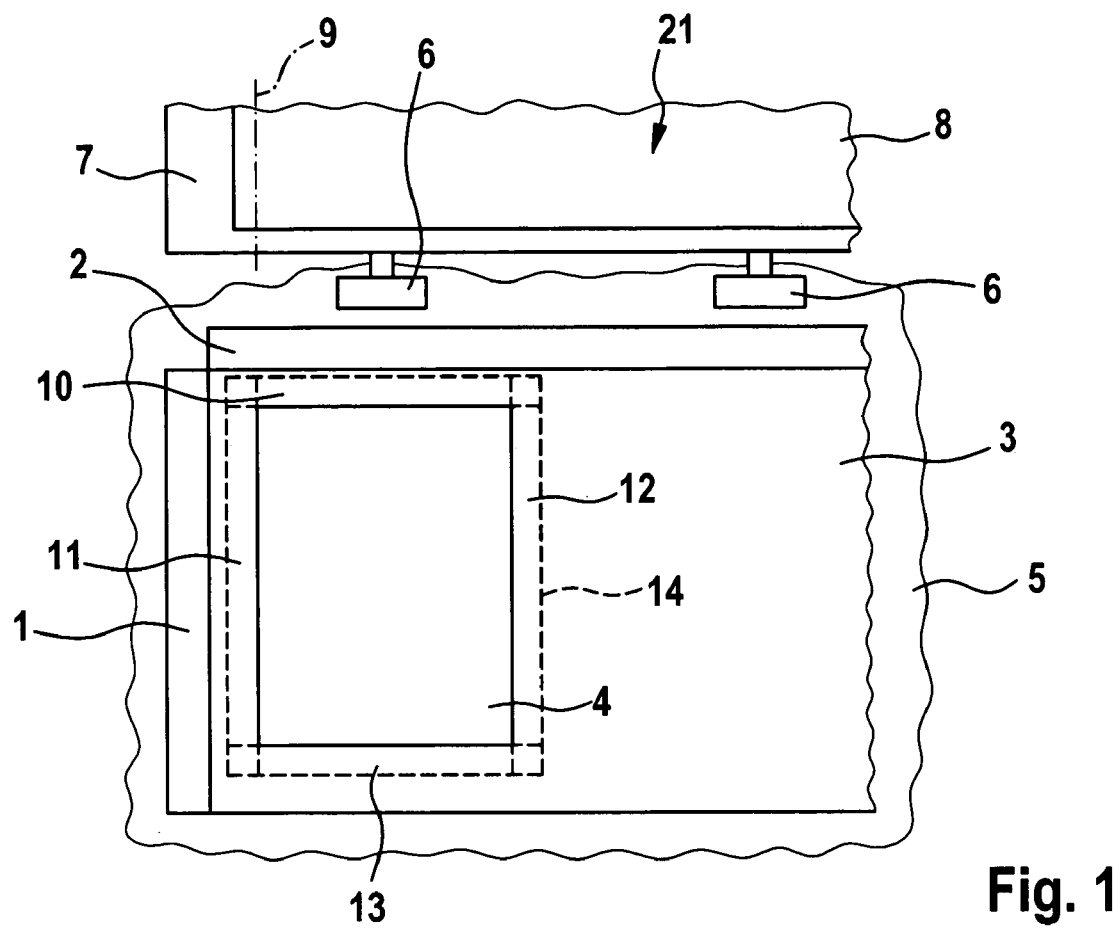
FIG. 1 shows schematically a detail plan view of the measuring device.

The measuring device shown in FIG. 1 is a modified or converted scanner, model Epson Expression 1640 XL, reference being made to relevant company brochures for the structure and manner of operation.

Figure 2:
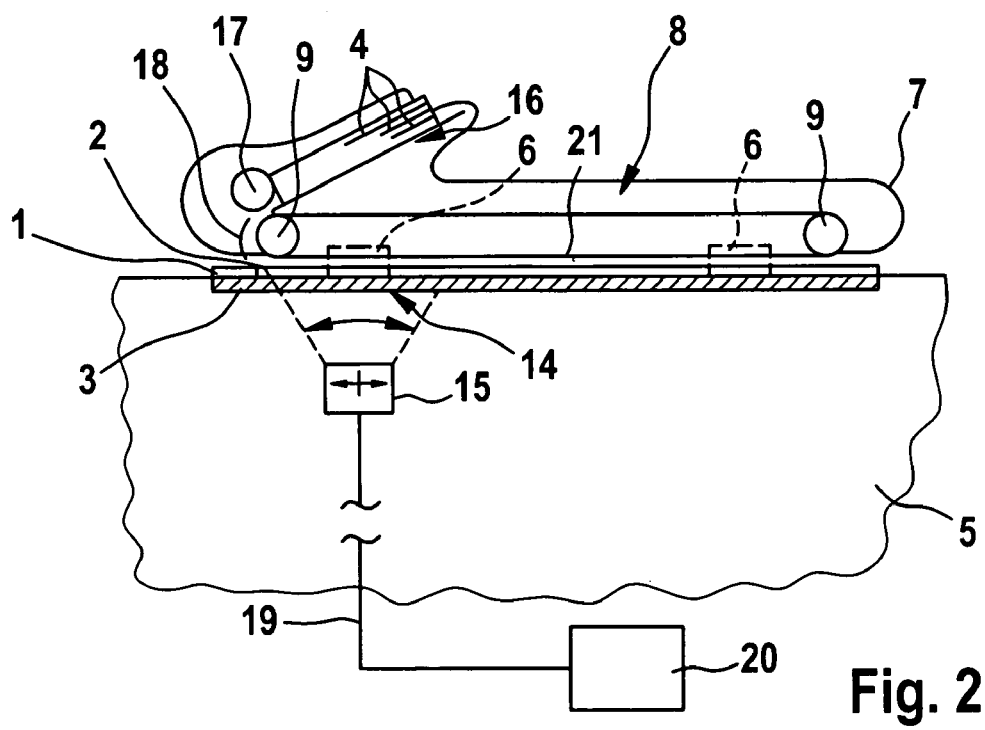
FIG. 2 shows schematically a detail side view of the measuring device from FIG. 1.

The measuring device shown in FIG. 1 and FIG. 2 includes a first stop 1 constructed as a vertical stop, a second stop 2 arranged perpendicularly thereto and constructed as a horizontal stop, and a scanning substrate 3 which holds a sheet 4. The measuring device further includes a housing 5 which receives the vertical stop 1 and the horizontal stop 2, the scanning substrate 3 and, via hinges 6, a lid 7. The lid 7 is connected to the housing 5 so as to be pivotable back and forth onto the scanning substrate 3 via the hinges 6. In the lid 7 is arranged a belt conveyor 8 with two deflecting rollers 9 and a belt 21 forming a cover for the sheet 4 (in FIG. 1 the axis of rotation of a deflecting roller is marked 9). The horizontal stop 2 and the vertical stop 1 are arranged at the left or at the rear boundary edge of the scanning substrate 3. A scanning device 15 provided in the housing 5 scans a region of the scanning substrate 3, forming a scanning window 14 (shown in dashed lines). The scanning device 15 is arranged so as to be movable parallel to the scanning substrate 3. The scanning window 14 is adjusted by control of the scanning device 15 so as to overlap the sheet surface on all sides. The sheet 4 is positioned on the scanning substrate 3 to form edge regions 10, 11, 12 and 13 (shown in dashed/dotted lines) between the cut edges of the sheet and the scanning window 14. In the lid 7 is further provided a sheet holder 16 at an angle to the conveyor 8, with an intake roller 17 arranged on the intake side and a curved deflecting plate 18. The sheet holder 16 is provided with a stop, not shown, which is positioned in such a way that the sheet 4 comes off the conveyor 8, forming an edge region 10, for deposition on the scanning substrate 3. The scanning device 15 is connected by a wire 19 to a computer 20.

To test a sheet 4, the sheet is drawn in from the sheet holder 16 by the intake roller 17 and the conveyor 8 and laid on the scanning substrate 3 within the scanning window 14 and scanned by the scanning device 15 with a resolution of 1200 dpi. The signals picked up during scanning—caused by differences in contrast between the sheet 4 and the cover 21—are transmitted via the wire 19 to the computer 20 and there evaluated and displayed graphically on a screen (not shown) connected to the computer.

The stops 1 and 2 in the present invention can also be formed by corresponding boundary edges of the scanning substrate 3, as form-fit abutment of the sheet is not necessary. Formation of the edge regions 10, 11, 12, 13 in coordination between scanning window 14 and sheet 4 is essential.

The invention claimed is:

1. A measuring device for testing the cut quality of a sheet, comprising:
    a transparent scanning substrate for holding the sheet,
    a scanning device defining a scanning window in a region of the scanning substrate, and
    a cover for covering the sheet held by the scanning substrate, wherein the scanning window overlaps the sheet, forming edge regions, and the cover has different reflection properties from the sheet for producing a high-contrast scanned image of the sheet and of the edge regions between the sheet and the scanning window.

2. The measuring device according to claim 1, wherein the scanning device is connected by a wire to a computer for evaluating the scanned image.

3. The measuring device according to claim 1, wherein adjacent to the scanning substrate is provided a sheet holder for a stack of sheets and a conveyor for drawing in and positioning a sheet.

4. The measuring device according to claim 3, wherein the conveyor is designed as a belt conveyor and the cover is formed by the belt of the belt conveyor.

5. The measuring device according to claim 4, wherein the belt is made of rubber blanket.

6. The measuring device according to claim 3, wherein the conveyor is formed by transport rollers and the cover is formed by a cover plate spaced apart from the scanning substrate.

7. The measuring device according to claim 3, wherein the conveyor is designed to convey stepwise over the length or width of a sheet and is offset from a stop in the direction of conveying in such a way that the sheet can be laid at a distance from the stop.

8. The measuring device according to claim 3, wherein the conveyor is designed to convey stepwise over the length or width of a sheet plus a distance x and the sheet can be laid at a distance from a stop.

9. The measuring device according to claim 3, wherein the cover, the sheet holder and/or the conveyor is held in a lid mounted pivotably by means of hinges adjacent to the scanning substrate.

10. A measuring method for testing the cut quality of a sheet, comprising:
    positioning the sheet on a transparent scanning substrate,
    covering the sheet with a cover, wherein the cover has different reflection properties from the sheet,
    scanning the sheet with a scanning device, wherein the scanning device scans in the region of a scanning window which encompasses both the sheet and edge regions surrounding the sheet, and
    detecting differences in contrast between the sheet and the edge regions.

11. The measuring method according to claim 10, further comprising
    transmitting signals corresponding to the differences in contrast from the scanning device via a wire to a computer and
    evaluating the signals with the computer.

12. The measuring method according to claim 10, wherein the sheet is laid in a sheet holder and drawn in and positioned on the scanning substrate by a conveyor.

13. The measuring method according to claim 10, wherein the scanning device scans with a resolution of approximately equal to or more than 1000 dpi.

14. The measuring method according to claim 10, wherein the sheet is conveyed and positioned on the scanning substrate by a belt conveyor and covered by the belt of the belt conveyor.

15. The measuring method according to claim 10, wherein the sheet is conveyed onto the scanning substrate by transport rollers and covered by a cover plate spaced apart from the scanning substrate.

16. The measuring method according to claim 14, wherein the conveyor is offset from a stop in the direction of conveying and conveys stepwise over the length or width of a sheet and lays the sheet at a distance from the stop.

17. The measuring method according to claim 14, wherein the conveyor conveys stepwise over the length or width of a sheet plus a distance x and lays the sheet at a distance from a stop.

18. The measuring method according to claim 13, wherein the scanning device scans with a resolution of approximately 1200 dpi.

19. The measuring device according to claim 1, further comprising:
    a sheet holder for holding a stack of sheets, wherein the cover comprises a conveyor constructed to draw a sheet from the sheet holder and position the sheet on the scanning substrate within the scanning window; and
    a computer connected to the scanning device and configured to evaluate the scanned image to measure the cut quality of the sheet.

* * * * *